United States Patent
Cosentino et al.

(10) Patent No.: US 12,457,095 B2
(45) Date of Patent: Oct. 28, 2025

(54) ADAPTIVE ASYMMETRIC-KEY COMPRESSION FOR IDEMPOTENT DATA STORES IN COMPUTER MESSAGING

(71) Applicant: Red Hat, Inc., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 18/166,355

(22) Filed: Feb. 8, 2023

(65) Prior Publication Data

US 2024/0267204 A1 Aug. 8, 2024

(51) Int. Cl.
*H04L 9/08* (2006.01)
*H03M 7/30* (2006.01)

(52) U.S. Cl.
CPC ........ *H04L 9/0822* (2013.01); *H03M 7/6064* (2013.01); *H04L 9/0825* (2013.01)

(58) Field of Classification Search
CPC ... H04L 9/0822; H04L 9/0825; H03M 7/6064
See application file for complete search history.

(56) References Cited

U.S. PATENT DOCUMENTS

| | | | |
|---|---|---|---|
| 9,423,964 B1 * | 8/2016 | Randall | G06F 3/061 |
| 10,007,566 B1 | 6/2018 | Sweetland | |
| 11,178,197 B2 | 11/2021 | Ghare | |
| 11,321,324 B2 | 5/2022 | Kuang et al. | |
| 2003/0182414 A1 * | 9/2003 | O'Neill | G06F 8/658 |
| | | | 717/170 |
| 2004/0215755 A1 * | 10/2004 | O'Neill | G06F 8/658 |
| | | | 717/170 |
| 2008/0040505 A1 * | 2/2008 | Britto | G06F 3/0667 |
| | | | 709/226 |
| 2021/0389883 A1 | 12/2021 | Derryberry et al. | |

(Continued)

FOREIGN PATENT DOCUMENTS

CA 2953826 7/2017

OTHER PUBLICATIONS

"Red Hat Fuse 7.3—Apache Camel Component Reference", Jun. 15, 2021, Red Hat, Inc., https://access.redhat.com/documentation/en-us/red_hat_fuse/7.3/pdf/apache_camel_component_reference/red_hat_fuse-7.3-apache_camel_component_reference-en-us.pdf, 2,371 pages.

(Continued)

*Primary Examiner* — Abiy Getachew
(74) *Attorney, Agent, or Firm* — Dority & Manning, P.A.

(57) ABSTRACT

A method includes: receiving, by a server node, a first notification indicating that a first message received by a first node of a cluster of nodes is not a redundant message and cannot be stored by a data store of the nodes, wherein the nodes are managed by the server node; determining to invoke a compression process used to compress message identifiers stored in the first node; receiving a first public key associated with the first node; generating a compression key; generating a first encrypted compression key by encrypting the compression key with the first public key; sending, to the first node, the first encrypted compression key; and receiving, from the first node, a second notification of storing, in a compressed form using a key decrypted from the first encrypted compression key, at least one message identifier in a data store of the first node.

20 Claims, 8 Drawing Sheets

(56) References Cited

U.S. PATENT DOCUMENTS

2022/0181005 A1* 6/2022 Narvaez ............. G06F 12/0802
2023/0281174 A1* 9/2023 Madan ................. G06F 16/215
707/692

OTHER PUBLICATIONS

Rittera, Daniel et al., "Patterns for Emerging Application Integration Scenarios: A Survey", 2017, SAP SE, Germany; University of Vienna, Faculty of Computer Science, https://eprints.cs.univie.ac.at/5101/1/RMR_InfSystems2017_EmergingPatters_authorversion.pdf, 32 pages.

* cited by examiner

300A

PROXIMITY TABLE 155

| Node ID | Distance | Enabled Status | Remaining Storage | Remaining Battery | Public Key |
|---|---|---|---|---|---|
| 111 | D1 (Level 1) | Y | S1 | B1 | K1 |
| 112 | D2 (Level 1) | N | S2 | B2 | K2 |
| 121 | D3 (Level 1) | Y | ... | ... | ... |
| 122 | D4 (Level 1) | Y | ... | ... | ... |
| ... | ... | ... | ... | ... | ... |

NODE DATA STRUCTURE 156

| Node ID | Enabled Status | Remaining Storage | Remaining Battery | Public Key | Private Key | Encrypted Compression Key | Decrypted Compression Key | Compression Status |
|---|---|---|---|---|---|---|---|---|
| 250 | Y | S0 | B0 | K0 | PK0 | ECP0 | DCP0 | Y |
| ... | ... | ... | ... | ... | ... | ... | ... | ... |

FIG. 3A

COMPRESSION TABLE 157

| Node ID | Public Key | Encrypted Compression Key | Compression Status | ... | Enabled Status | Remaining Storage | Remaining Battery |
|---|---|---|---|---|---|---|---|
| 111 | K1 | ECP1 | Y | ... | Y | S1 | B1 |
| 112 | K2 | ECP2 | Y | ... | N | S2 | B2 |
| 121 | ... | | N | ... | Y | ... | ... |
| 122 | ... | | N | ... | Y | ... | ... |
| ... | ... | | ... | ... | ... | ... | ... |
| 250 | K0 | ECP0 | Y | ... | Y | S0 | B1 |
| ... | ... | | ... | ... | ... | ... | ... |

FIG. 3B

ADAPTIVE ASYMMETRIC-KEY COMPRESSION FOR IDEMPOTENT DATA STORES IN COMPUTER MESSAGING

TECHNICAL FIELD

The present disclosure is generally related to computer systems, and is more specifically related to implementing adaptive asymmetric-key compression for idempotent data stores in computer messaging.

BACKGROUND

Messages can be sent between various applications of computer systems. These messages can be sent through messaging protocols used in computer communication systems.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A and 3B depict example data structures for implementing adaptive asymmetric-key compression for idempotent data stores in computer messaging, in accordance with one or more aspects of the present disclosure.

DETAILED DESCRIPTION

Figure 1:
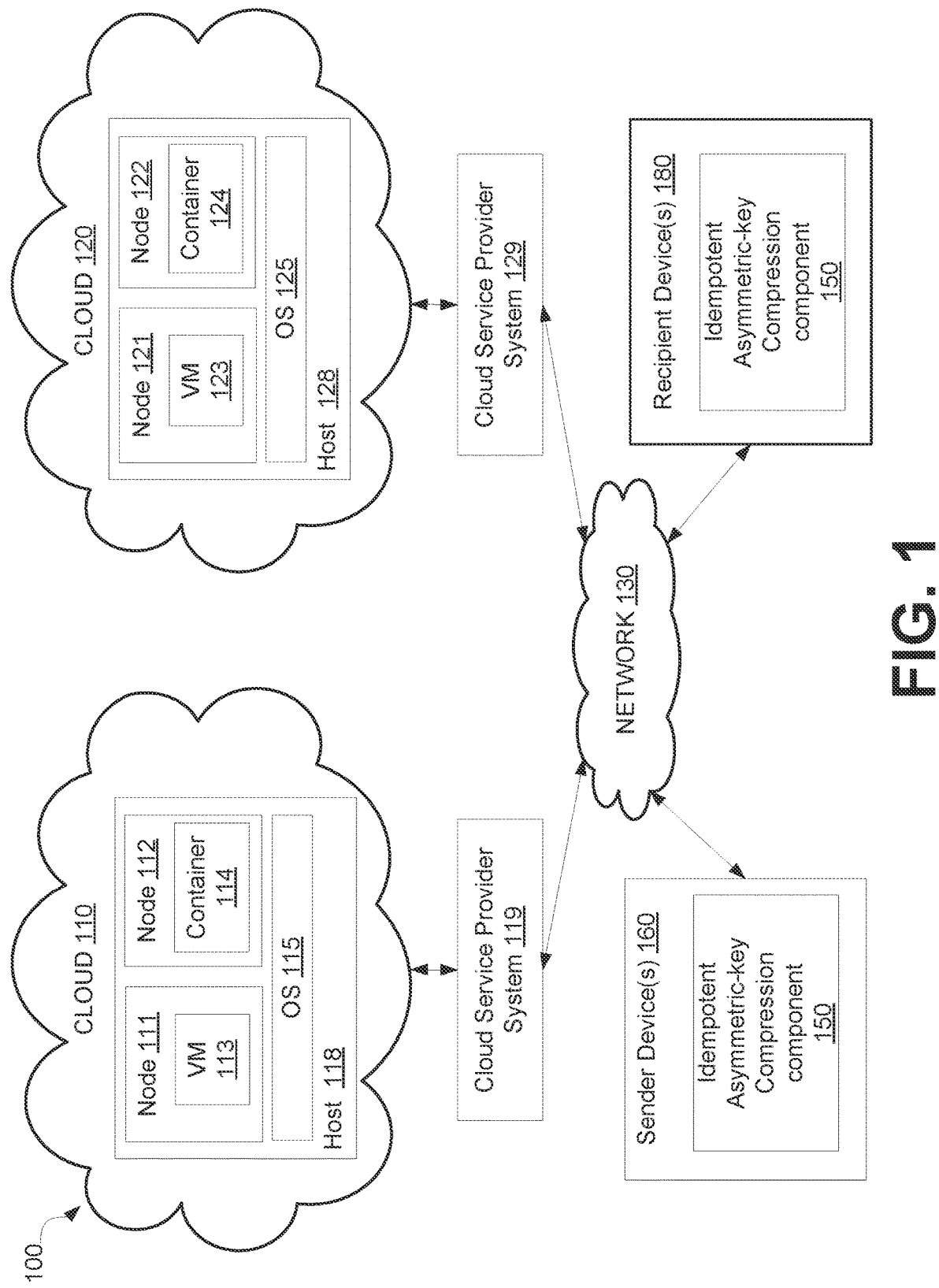
FIG. 1 depicts a high-level component diagram of an example of a computer system architecture, in accordance with one or more aspects of the present disclosure.

Described herein are methods and systems for implementing adaptive asymmetric-key compression for idempotent data stores in computer messaging. Some applications and/or compute systems may communicate via messages of an agreed-upon and/or changing format that are sent between senders and receivers. A sender device may send a message to a recipient device, and the recipient device may take an action in response to receipt of a message depending on the ingesting device and/or software as well as on the content of the message (e.g., the payload of the message). For example, a message may indicate a current temperature of a temperature sensor. A different message may indicate that a vehicle has passed through an intersection that is monitored by a sensor, etc. In some cases, duplicate (i.e., two or more copies of) messages may be received by a particular recipient device even when the message was only generated and/or sent once by the sender. This may happen due to different routing architectures that may duplicate and/or reroute a particular message. For example, sender device A may send a single message to recipient device C, however, a program executing at recipient device B may cause the message to be forwarded to recipient device C. Accordingly, recipient device C may receive two copies of the same message.

In some cases, duplicate messages may not cause any issue. For example, the payload of the message may indicate a current temperature and the recipient may write the temperature value into a field of a data structure in memory. In such a case, the same temperature may be written a first time and then, when the duplicate of the message is received, the temperature value may be used to overwrite the duplicate value. Assuming that these two duplicate temperature value messages are received close in time to one another, this may not cause a problem. However, in other cases, receipt of duplicate messages may cause an issue. For example, in the traffic monitoring example described above, if a duplicate message is received, a counter may be updated to indicate that two vehicles pass through the monitored intersection instead of only a single vehicle, resulting in an inaccurate tally which may, in turn, have serious consequences (e.g., changing a traffic light cycle based on the inaccurate tally which could lead to serious traffic congestion).

Additionally, parsing and/or performing operations in response to duplicate, redundant messages may consume additional compute resources (e.g., in terms of processor cycles, memory resources, and/or power). This may be especially problematic for edge computing devices which may be resource constrained. In edge computing systems, computing resources are often provisioned at different tiers and at different geographically distributed nodes. In such systems, it may be advantageous to deploy different compute resources at different hierarchical levels of the edge network in order to optimize compute footprint and/or performance. Deployment of compute services across multiple clusters in an edge network may allow for more efficient use of compute resources and may provide better service and/or lower latency relative to deployment within a centralized cluster. However, devices that are positioned at the edge of such systems ("edge devices") may be resource-constrained devices. For example, edge computing devices may include battery-powered sensors, internet-of-things devices that include minimal computing hardware, etc. Minimization of compute load and/or power consumption by such devices is often highly prioritized. For example, edge computing devices may have minimal processing capability, may have limited bandwidth, and/or may be battery powered. In such edge computing devices, performing unnecessary actions due to the receipt (or generating and/or sending) of duplicate messages may cause the battery-life to be drained more quickly and/or may cause increased CPU usage.

Aspects of the present disclosure address the above-noted and other deficiencies by implementing adaptive asymmetric-key compression of identifiers of messages for idempotent data stores. The idempotent data store may be implemented in a manner that prevents storing duplicate data items, by rejecting a copy of a data item that has already been stored in the data store. The term "idempotent" is used in mathematics to describe a function that produces the same result if it is applied to itself (i.e., $f(x)=f(f(x))$). In computer messaging, this concept translates into a message that has the same effect whether it is received once or multiple times. This means that a message can safely be resent without causing any problems even if the recipient device receives duplicates of the same message. A computing device associated with the idempotent data store can detect duplicate messages in a computing system (e.g., a cluster of nodes) and acts as a filter so that duplicate messages are not consumed (e.g., the payload is not parsed and/or is not used by the recipient). In some implementations, messages may include message identifiers (e.g., data that uniquely identifies the message from among other messages) and payload data (e.g., the contents of the message). The idempotent data store may be used to store message identifiers. Accordingly, when a new message is received, the computing device may consult the idempotent data store (which may be distributed as multiple idempotent data stores) to determine if the message identifier of the new message is currently stored in the idempotent data store.

If the idempotent data store has stored the message identifier of the new message, the computing device may determine that the new message is a duplicate and discard the new message. For example, the computing device may send instructions to the recipient device (e.g., the addressee of the message) to instruct the recipient device to discard the message without ingesting any of the payload data. In some implementations, the computing device may provide an idempotent service. The idempotent service refers to a process to determine whether a message identifier is already stored in the idempotent data store, and responsive to determining that the message identifier is already stored in the idempotent data store, to intercept the message prior to receipt by the recipient device and discard the message thus prevent the message from being forwarded to the recipient device.

If the computing device determines that the message identifier of the new message is not stored in the idempotent data store, the computing device may determine whether any idempotent data store is available to store the new message. In some implementations, a set of idempotent data stores may be distributed throughout a cluster of nodes, each node corresponds to one idempotent data store of the set of idempotent data stores, and the computing device may determine whether any idempotent data store of the set of idempotent data stores is available to store the new message.

To determine whether any idempotent data store is available to store the new message, the computing device may determine whether the remaining resources (e.g., storage, battery, etc.) associated with a node that can be used to store the new message satisfy one or more threshold criteria. The node that can be used to store the new message may be a node in a cluster receiving the new message and/or a node participating in the idempotent service. In one example, a threshold criterion may ascertain that the remaining amount of storage of a node exceeds a predefined value. In one example, a threshold criterion may ascertain that the remaining battery life of a node exceeds a predefined value. In one example, the threshold criterion may ascertain that the remaining battery life of a node exceeds a predefined first value and the remaining battery life of the node exceeds a predefined second value. In some implementations, to determine whether the remaining resources associated with a node satisfy a threshold criterion, the computing device may check each node in a random order or all nodes simultaneously. In some implementations, to determine whether the remaining resources associated with a node satisfy a threshold criterion, the computing device may check the nodes in an order with the highest remaining resource first, the second highest remaining resource second, and so on.

Responsive to determining that the remaining resources associated with a node satisfy a threshold criterion, the computing device may determine that the idempotent data store is available to store the new message and use the idempotent data store to store the new message. Responsive to determining that there is no node with the remaining resources satisfying the threshold criterion, the computing device may determine that the idempotent data store is not available to store the new message.

Upon determining that the new message cannot be stored, the computing device may invoke a compression process that compress message identifiers stored in the idempotent data store in order to increase the available resources of the system (e.g., remaining resources of the nodes). Invoking the compression process may involve obtaining information required for generating compression keys used in compression. In some implementations, the computing device may obtain node identifiers of nodes associated with the idempotent data store, and obtain a public key associated with each node identifier to generate a compression key for each node. In some examples, the computing device may obtain, from a proximity table of a specific node (e.g., the node receiving the new message), node identifiers of adjacent nodes of the specific node and obtain public keys corresponding to the node identifiers. The proximity table of a specific node may contain a list of nodes that are within a predefined distance from the specific node, with the information regarding the node identifier, node's remaining amount of storage, node's remaining battery life, and node's public key. For each node, a pair of keys, i.e., a public key and a private key, may be generated and used for encryption and decryption associated with the node. In some examples, the computing device may obtain, from a management data store, node identifiers of all nodes participated in the idempotent service and obtain public keys corresponding to the node identifiers.

The computing device may generate a compression key (e.g., a key randomly generated for compression) and encrypt the compression key using the node's respective public key to generate an encrypted compression key for each node. The computing device may send, to a respective node (i.e., the node with the respective public key), the node's encrypted compression key. Each node receiving the encrypted compression key may decrypt the encrypted compression key using the node's private key. Each node may use the decrypted compression key to compress message identifiers stored in the node's idempotent data store. Upon compressing the message identifiers, each node may update its remaining amount of storage and remaining battery life, thus allowing the computing device to determine whether there is enough space in the idempotent data store for storing the new message. The computing device may determine whether the remaining resources (e.g., storage, battery, etc.) associated with a node satisfy one or more threshold criteria for compression.

Further, the computing device may store a list of nodes each with the node identifier and its remaining amount of storage and remaining battery life, and keep the information updated by requesting the information from each node at certain time points. The computing device may determine, at a specific time point, whether to invoke a decompression process to decompress the message identifier stored in a node's idempotent data store. In some implementations, the computing device may determine to invoke a decompression process when the remaining resources associated with a node does not satisfy one or more threshold criteria for compression. In some implementations, the computing device may determine to invoke a decompression process when the remaining resources associated with a node satisfy one or more threshold criteria designed for decompression. Responsive to determining to invoke a decompression process, the computing device may send to the corresponding node an instruction to decompress the message identifiers. Each node receiving the decompression instruction may decompress the message identifiers stored in the respective idempotent data store using the decrypted compression key stored therein.

Advantages of the present disclosure include increasing security by using adaptive asymmetric-key compression for idempotent data stores in computer messaging. The present disclosure enhances compute performance by reducing power consumption, memory consumption, latency, and/or CPU usage. The present disclosure also reduces the number of processor cycles allocated to redundant operations and adaptively provides additional storage by secure compression and decompression. Such techniques may be particularly useful in resource-constrained devices such as battery-powered edge devices (e.g., sensors and/or other network edge devices).

FIG. 1 depicts a high-level component diagram of an illustrative example of a computing system 100 in accordance with one or more aspects of the present disclosure. In some implementations, the computing system 100 may be used in a computing services platform. A computing services platform may include a Platform-as-a-Service (PaaS) system. The PaaS system provides resources and services (e.g., micro-services) for the development and execution of applications owned or managed by multiple users. A PaaS system provides a platform and environment that allow users to build applications and services in a clustered compute environment. Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

The computing system 100 includes one or more sender devices 160 and one or more recipient devices 180. The sender devices 160 may send messages via network 130 to the recipient devices 180. Each sender device 160 or each recipient device 180 may be a mobile device, a PDA, a laptop, a desktop computer, a tablet computing device, a server device, or any other computing device.

As shown in FIG. 1, the computing system 100 includes one or more cloud-computing environment 110, 120 (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 118, 128 implemented as part of the clouds 110, 120. For example, nodes 111 and 112 are hosted on physical machine of host 118 in cloud 110 provided by cloud provider 119. Similarly, nodes 121 and 122 are hosted on physical machine of host 128 in cloud 120 provided by cloud provider 129. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 118, 128. It should be noted, that while two cloud providers systems have been depicted in FIG. 1, in some implementations more or fewer cloud service provider systems (and corresponding clouds) may be present.

In some implementations, the host machines 118, 128 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 118, 128 without the use of VMs (e.g., a "bare metal" implementation), and in such an implementation, the hosts themselves are referred to as "nodes".

In various implementations, developers, owners, and/or system administrators of the applications may maintain applications executing in clouds 110, 120 by providing software development services, system administration services, or other related types of configuration services for associated nodes in clouds 110, 120. This can be accomplished by accessing clouds 110, 120 using an application programmer interface (API) within the applicable cloud service provider system 119, 129. In some implementations, a developer, owner, or system administrator may access the cloud service provider system 119, 129 from a client device (e.g., client device 160) that includes dedicated software to interact with various cloud components. Additionally, or alternatively, the cloud service provider system 119, 129 may be accessed using a web-based or cloud-based application that executes on a separate computing device (e.g., recipient device 180) that communicates with sender device 160 via a network 130.

In some implementations, each sender device 160 or each recipient device 180 is connected to host 118 in cloud 110 and host 128 in cloud 120 and the cloud service provider systems 119, 129 via a network 130, which may be a private network (e.g., a local area network (LAN), a wide area network (WAN), intranet, or other similar private networks) or a public network (e.g., the Internet). Each host 118, 128 may be a server computer system, a desktop computer, or any other computing device. The cloud service provider systems 119, 129 may include one or more machines such as server computers, desktop computers, etc.

In some implementations, the communication between sender device 160 and recipient device 180 may use various messaging protocols. For example, Representational State Transfer (REST) API uses the synchronous paradigm of communication, where a message is sent and a response is waited for before making a new request. REST API calls are often referred to as "synchronous" API calls indicating that code execution and user interaction is stopped until the call returns the requested information. Other messaging architectures, such as event-driven architectures (EDAs) employ asynchronous communication, where code execution and/or user interaction need not stop to wait for the response. In EDAs, messages are sent by a "publisher" (an entity generating the data) to a message broker. The message broker may be infrastructure that stores the message and delivers the message to "subscribers" (applications that have registered to receive the particular message from the particular publisher). Various techniques described herein may refer to messaging protocols generally—whether synchronous or asynchronous.

In some implementations, each sender device 160 or each recipient device 180 may include one or more processor(s) (e.g., central processing unit (CPU)) communicatively coupled to one or more memory devices and one or more input/output (I/O) devices. The processors refer to devices capable of executing instructions encoding arithmetic, logical, and/or I/O operations. In one example, a processor may follow Von Neumann architectural model and may include an arithmetic logic unit (ALU), a control unit, and a plurality of registers. In another example, a processor may be a single core processor which is typically capable of executing one instruction at a time (or process a single pipeline of instructions), or a multi-core processor which may simultaneously execute multiple instructions and/or threads. In yet another example, a processor may be implemented as a single integrated circuit, two or more integrated circuits, or may be a component of a multi-chip module (e.g., in which individual microprocessor dies are included in a single integrated circuit package and hence share a single socket).

In some implementations, each sender device 160 or each recipient device 180 may include memory devices. The memory devices may be volatile or non-volatile memory devices, such as random access memory (RAM), read-only memory (ROM), EEPROM, or any other device capable of storing data. In one example, memory devices may be persistent storage devices such as hard drive disks (HDD), solid state drives (SSD), and/or persistent memory (e.g., Non-Volatile Dual In-line Memory Module (NVDIMM)). Memory devices may additionally include replication of data to prevent against data loss due to a failure in any one device. This replication may be implemented through, for example, a redundant array of independent disks (RAID) setup. RAID arrays may be designed to increase performance, to provide live data backup, or a combination of both. I/O devices may include devices capable of providing an interface between one or more processor pins and an external device, the operation of which is based on the processor inputting and/or outputting binary data. CPU(s) may be interconnected using a variety of techniques, ranging from a point-to-point processor interconnect, to a system area network, such as an Ethernet-based network. Local connections within physical hosts, including the connections between processors and memory devices and between processors and I/O device may be provided by one or more local buses of suitable architecture, for example, peripheral component interconnect (PCI).

In one example, a host may run one or more isolated guests, for example, virtual machine, which may in turn host additional virtual environments (e.g., VMs and/or containers). In one example, a container (e.g., storage container, service container) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container and/or service container may run directly on a host operating system or run within another layer of virtualization, for example, in a virtual machine. In one example, containers that perform a unified function may be grouped together in a container cluster that may be deployed together (e.g., in a Kubernetes® pod). In one example, a given service may require the deployment of multiple VMs, containers and/or pods in multiple physical locations. In an example, VM may be a VM executing on the host.

Each sender device 160 or each recipient device 180 may run one or more VMs, by executing a software layer (e.g., hypervisor) above the hardware and below the VM. In an example, the hypervisor may be a component of respective host operating system executed on physical host, for example, implemented as a kernel based virtual machine function of host operating system. In another example, the hypervisor may be provided by an application running on host operating system. In one example, hypervisor may run directly on physical host without an operating system beneath hypervisor. Hypervisor may virtualize the physical layer, including processors, memory, and I/O devices, and present this virtualization to VM as devices, including virtual central processing unit ("VCPU"), virtual memory devices ("VMD"), virtual input/output ("VI/O") device, and/or guest memory. In one example, another virtual guest (e.g., a VM or container) may execute directly on host OSs without an intervening layer of virtualization.

In an example, a VM may be a virtual machine and may execute a guest operating system which may utilize the underlying VCPU, VMD, and VI/O. Processor virtualization may be implemented by the hypervisor scheduling time slots on physical CPUs such that from the guest operating system's perspective those time slots are scheduled on a virtual processor. VM may run on any type of dependent, independent, compatible, and/or incompatible applications on the underlying hardware and host operating system. The hypervisor may manage memory for the host operating system as well as memory allocated to the VM and guest operating system such as guest memory provided to guest OS.

In an example, a storage controller may manage storage in dedicated storage nodes (e.g., NAS, SAN, etc.). In an example, the storage controller may deploy storage in large logical units with preconfigured performance characteristics (e.g., storage nodes). In an example, access to a given storage node (e.g., storage node) may be controlled on an account and/or tenant level. In an example, a service container (e.g., service containers) may require persistent storage for application data and may request persistent storage with a persistent storage claim to orchestrator. In the example, the storage controller may allocate storage to service containers through a storage node (e.g., storage nodes) in the form of a persistent storage volume. In an example, a persistent storage volume for service containers may be allocated a portion of the storage capacity and throughput capacity of a given storage node (e.g., storage nodes). In various examples, the storage container and/or service containers may deploy compute resources (e.g., storage, cache, etc.) that are part of a compute service that is distributed across multiple clusters (e.g., including cluster).

The virtualized computing systems (e.g., service containers, VM) may be examples of computing environments that may deploy one or more of the techniques described herein for a distributed, idempotent data store for computer messaging (e.g., a distributed data store (e.g., cache) that may store message identifiers, as described herein). For example, service container may be a cache (or other memory) that may store message identifiers of received messages. Service container may include a different cache that may be part of the distributed, idempotent data store. Additionally, the other nodes may include memory that constitutes all or a portion of the distributed, idempotent data store(s) described herein. Upon receipt of a new message, the idempotent data store may be consulted to determine if the message identifier of the received message is presently stored in the idempotent repository. If the message identifier of the received message is presently stored in the idempotent repository, the message may be discarded prior to consumption of the payload. In some examples, if the message identifier is not stored, a determination may be made (e.g., using a priority table related to the idempotent service) of a node that has the most available memory. The message identifier may be sent to that node for storage. In various further examples, if a determination is made that no node of the idempotent service has sufficient memory, a signal may be sent to server node. The server node may respond by requesting public key of each node, encrypting a compression key using the public key of each node, sending the respective encrypted compression key (e.g., a cryptographic key that may be used to compress data) to each of the nodes of the idempotent service together with instructions to compress one or more message identifiers stored by the nodes. Each node receiving the encrypted compression key may decrypt the respective encrypted compression key using a private key paired with the public key for each node, and store the decrypted compression key for use of decompression. Later, as the nodes have more available memory, the server node may send decompression instructions to the nodes to have the nodes decompress the compressed message identifiers (to reduce latency of the idempotent service) by using the respective decrypted compression key.

In some implementations, the recipient device 180 may include an idempotent asymmetric-key compression component 150, which can implement asymmetric-key compression for an idempotent service. The details regarding idempotent asymmetric-key compression component 150 will be described with respect to FIGS. 2A-6. Idempotent asymmetric-key compression component 150 may be an application that executes on sender device 160 and/or recipient device 180. In some implementations, idempotent asymmetric-key compression component 150 can function as a web-based or cloud-based application that is accessible to the user via a web browser or thin-client user interface that executes on sender device 160 and/or recipient device 180. For example, sender device 160 and/or recipient device 180 may present a graphical user interface (GUI) (e.g., a webpage rendered by a browser) to allow users to input data, which may be processed using idempotent asymmetric-key compression component 150. The process performed by idempotent asymmetric-key compression component 150 can be invoked in a number of ways, such as, e.g., a web front-end and/or a Graphical User Interface (GUI) tool. In some implementations, a portion of idempotent asymmetric-key compression component 150 may execute on sender device 160 and another portion of network tool component 150 may execute on recipient device 180. While aspects of the present disclosure describe idempotent asymmetric-key compression component 150 as implemented in a PaaS environment, it should be noted that in other implementations, idempotent asymmetric-key compression component 150 can also be implemented in an Infrastructure-as-a-Service (IaaS) environment associated with a containerized computing services platform, such as Red Hat® OpenStack®. The functionality of idempotent asymmetric-key compression component 150 will now be described in further detail below with respect to FIGS. 2-6.

Figure 2A:
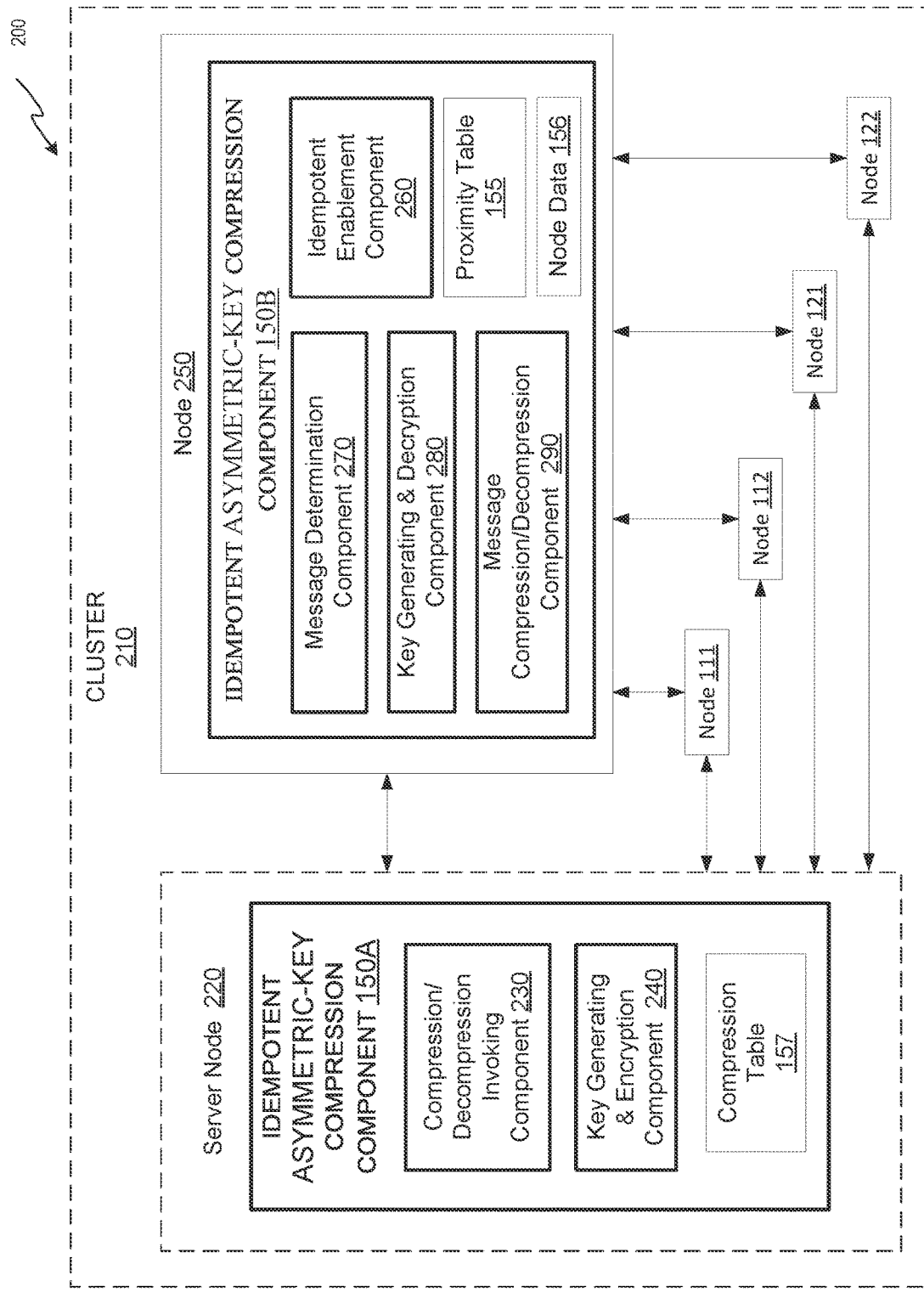
FIGS. 2A and 2B depict a component diagram of an example of a containerized computing cluster and communication flows between components of the example of the containerized computing cluster, in accordance with one or more aspects of the present disclosure.
Figure 2B:
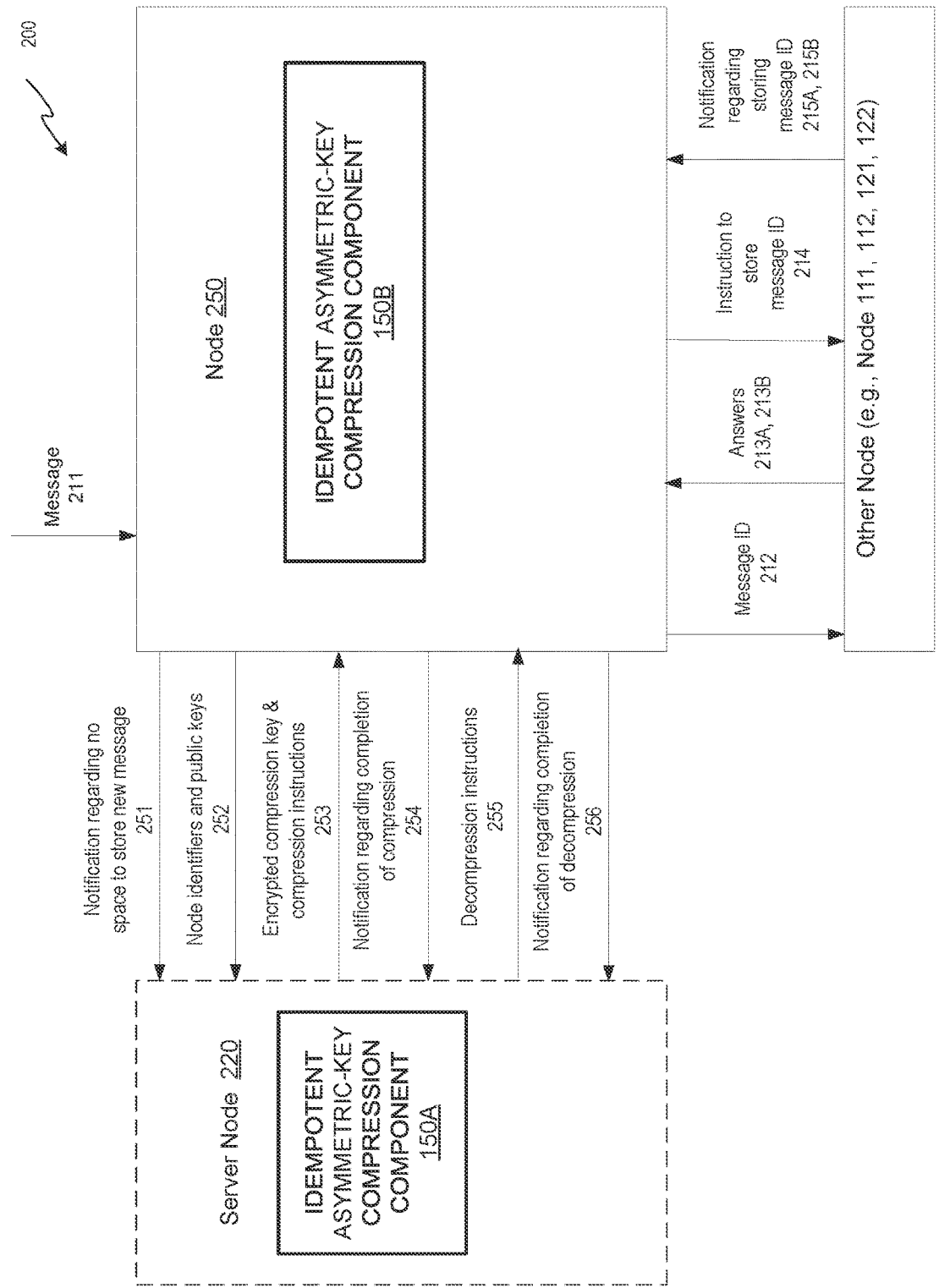

FIG. 2A illustrates an example system 200 implementing adaptive compression of a distributed, idempotent data store (e.g., data structure 208) for a computer-messaging architecture, according to various examples of the present disclosure. FIG. 2B illustrates the communication flows between the components of the systems 200. The system 200 includes a cluster 210. The cluster 210 is a distributed system managed by a container orchestration system, such as Kubernetes®.

The cluster 210 includes a server node 220 and a collection of nodes (e.g., nodes 111, 112, 121, 122) including a node 250. The server 220 may be a node managing the collection of nodes with respect to an idempotent service. Each node of the cluster 210 may include an idempotent asymmetric-key compression component 150. The cluster 210 may provide an idempotent service to multiple nodes (e.g., nodes 250, 111, 112, 121, 122). In the example of FIGS. 2A and 2B, node 250 and/or one or more other nodes (e.g., nodes 111, 112, 121, 122) may implement the idempotent service to filter out duplicate messages.

In some implementations, the server node 220 includes an idempotent asymmetric-key compression component 150A, and the node 250 includes an idempotent asymmetric-key compression component 150B. The idempotent asymmetric-key compression component 150A can include a compression/depression invoking component 230 and a key generating and encryption component 240. The idempotent asymmetric-key compression component 150B can include an idempotent enablement component 260, a message determination component 270, a key decryption component 280, and a message compression/decompression component 290.

Idempotent enablement component 260 may enable node 250 to join the idempotent service by setting up a proximity table 155. By setting up a proximity table for a node, the node is presumably enabled to participate in the idempotent service. In some implementations, the node can be disabled for the idempotent service by having the proximity table unavailable (e.g., deleted or inaccessible). When the idempotent service for node 250 is enabled, the node 250 can communicate with nodes participating in the idempotent service to filter out a duplicate message for all nodes participating in the idempotent service ("nodes of idempotent service"). In some implementations, in order to set up the proximity table, idempotent enablement component 260 may send a notification to other nodes (e.g., nodes 111, 112, 121, 122) in the cluster 210 that are within a distance defined by a distance threshold. For example, node 250 may send a notification to all "level 1 distance" neighbors of node 250 (e.g., as defined by the global configuration of the cluster) indicating that node 250 is joining the idempotent service. In response, each node receiving the notification from node 250 may send a response that indicates node identifier; node's remaining amount of storage; node's remaining battery life (if applicable); and node's status (enabled or disabled) with respect to the idempotent service. In response to receipt of this information from the other "level 1 distance" nodes (or other nodes within the distance threshold in the cluster), idempotent enablement component 260 may generate a proximity table 155 including the received information. In some implementations, idempotent enablement component 260 may set its status to "enabled" and store it in the data store, for example, the node data structure 156. As shown in FIG. 3A, the node data structure 156 of node 250 may include a node ID field representing the node IDENTIFIER of node 250, an enabled status field representing the status of node 250 with respect to the idempotent service, a remaining storage field representing the remaining storage of node 250, a remaining battery field representing the remaining battery of node 250, a public key field representing a key used for encryption, a private key field representing a key used for decryption, an encrypted compression key field representing a key received for compression, a decrypted compression key field representing a key used for compression, and a compression status field representing the status of node 250 with respect to compression.

Idempotent enablement component 260 may also store its node identifier, remaining storage, and remaining battery in the proximity table 155. After generating the proximity table 155, idempotent enablement component 260 may send the same data (i.e., its node identifier, remaining storage, and remaining battery) to other nodes in the proximity table 155 so that the other nodes in the idempotent service may update their respective proximity tables with the information about node 250.

As shown in FIG. 3A, the proximity table 155 of node 250 may include a node ID field (e.g., identifier of nodes 111, 112, 121, 122), a distance field (the distance between the respective node and node 250), an enabled status field ("enabled or disabled" with respect to the respective node), a remaining storage field (the remaining storage of the respective node), a remaining battery life field, and a public key field (the public key that can be used in encryption described below).

Message determination component 270 may enable node 250 to determine whether a received message is a new message that have not been stored in the nodes of the idempotent service. Specifically, node 250 may receive a message 211. The message may include a message identifier and payload data. In some examples, node 250 may be the addressee of the message. In some examples, node 250 may be part of the idempotent service that is evaluating the message to determine if the message is a duplicate prior to forwarding the message to the addressee/recipient (in the case that the received message is not a duplicate).

Message determination component 270 receiving the message 211 may extract the message identifier (e.g., message ID 212) from the received message. Message determination component 270 may search the data store (e.g., a data structure) of node 250 to determine if the message identifier is stored therein. If message determination component 270 determines that the message identifier has been stored in its data store, message determination component 270 discards (e.g., filter out) the message without ingesting the payload data of the message. If message determination component 270 determines that the message identifier has not been stored in its data store, message determination component 270 broadcasts the message ID 212 to each of other nodes in the cluster 210, including the nodes of the idempotent service (e.g., nodes 111, 112, 121, 122) and the other nodes in the cluster 210. Each node may search its data store (e.g., its local portion of the distributed idempotent data store) to determine if the message ID is stored therein. If a node determines that the message ID has been stored in its data store, the node may send, to node 250, a notification (e.g., answer 213A) indicating the existence of the message ID and discard the message without further action. If every node determines that the message ID has not been stored in its data store, message determination component 270 may receive, from every node, notifications (e.g., answer 213B) indicating that the message ID has not been stored or receive no answers, and message determination component 270 may determine that the received message is a new message (e.g., a message that has not previously been stored).

Responsive to determining that the received message is a new message, message determination component 270 may determine whether a node (e.g., a node in the cluster 210 or a node among the nodes that participate) is available to store the received message. Determining whether a node is available to store a message may involve determining whether the remaining resources of the node satisfy one or more threshold criteria. For example, message determination component 270 may determine whether the remaining storage satisfies a storage threshold criterion, whether the remaining battery satisfies a battery threshold criterion, or a combination thereof. To simplify the description, the remaining storage is used for the illustration below. In some implementations, message determination component 270 may identify a node for storing the message by comparing the remaining storage of each node with its respective storage thresholds (e.g., the storage threshold of each node is stored in the proximity table 155) to determine whether the node is available to store the message, instead of having each node to make its own determination.

In some implementations, message determination component 270 may check its remaining storage and compare the remaining storage to a storage threshold (e.g., low_memory_threshold). If the remaining storage of node 250 is above the storage threshold, message determination component 270 may store the message ID in the data store of node 250. If the remaining storage of node 250 is below or equals the storage threshold, message determination component 270 may consult the proximity table 155 to identify a node for storing the message.

In some implementations, message determination component 270 may identify, by searching in the proximity table 155, a node that is enabled with respect to the idempotent service (e.g., enabled status as "Y") and has the greatest remaining storage among the enabled nodes in the proximity table 155. For example, in the proximity table 155 shown in FIG. 3A, node 111 is enabled for the idempotent service and has the greatest remaining storage among nodes 111, 121, 122 that are enabled for the idempotent service. Responsive to identifying the node in the proximity table 155, message determination component 270 may send the message ID to the identified node (e.g., node 111) with instructions 214 to store message ID in the data store of the identified node. In some examples, the identified node (e.g., node 111) may determine whether its remaining storage is below or equals a storage threshold (which can be the same as or different from the storage threshold used for node 250). Responsive to determining that its remaining storage is above a storage threshold, the identified node may store the message ID and send, to node 250, a notification 215A indicating that the message ID has been stored. The identified node may also broadcast, to the nodes of the idempotent service, a message with respect to its updated remaining storage and updated remaining battery after storing the message ID, so that each node can update its respective proximity table. Responsive to determining that its remaining storage is below or equals a storage threshold, the identified node may send, to node 250, a notification 215B that the message ID cannot be stored. In such cases, message determination component 270 may identify another node that is enabled with respect to the idempotent service and has the next greatest remaining memory among the enabled nodes in the proximity table 155. The message determination component 270 may repeat the process until receiving a notification that an identified node has stored the message or until receiving notifications from all nodes in the proximity table 155 that the message cannot be stored. Responsive to receiving notifications from all nodes in the proximity table 155 that the message cannot be stored, message determination component 270 may determine that no node is available to store the received message.

Responsive to determining that no node is available to store the received message, message determination component 270 may send a notification 251 to the server node 220 indicating that the message cannot be stored. Upon receiving the notification 251, the compression/decompression invoking component 230 may enable the server node 220 to invoke a process for compression of message IDs stored in nodes of the idempotent service in the cluster 210 to increase the available resources (e.g., the remaining storage) of the nodes. In some implementations, the compression/decompression invoking component 230 may invoke a compression process to compress message IDs stored in one or more nodes (e.g., node 250) in the cluster 210. Invoking the compression process may involve obtaining information required for generating compression keys used in compression. For example, compression/decompression invoking component 230 may obtain (e.g., from the proximity table 155 of node 250) node identifiers 252 (e.g., node IDs) of nodes of the idempotent service and the public keys 252 corresponding to the node identifiers.

Compression/decompression invoking component 230 may generate and maintain a compression table 157. As shown in FIG. 3B, the compression table 157 may include a node ID field (e.g., identifier of nodes 111, 112, 121, 122, 250), a public key field (the public key associated with the respective node), an encrypted compression key field (the encrypted compression key associated with the respective node), and a compression status field ("compressed or decompressed" with respect to the respective node). In some implementations, the compression table 157 may include an enabled status field ("enabled or disabled" with respect to the respective node), a remaining storage field (the remaining storage of the respective node), and a remaining battery field (the remaining battery of the respective node). In some implementations, compression/decompression invoking component 230 can use the information updated in the compression table 157 to determine whether to invoke a compression process and/or a decompression process.

Responsive to the server node 220 invoking a compression process, key generating & encryption component 240 may generate a compression key. Key generating & encryption component 240 may use the public key associated with each node to encrypt the compression key and generate an encrypted compression key for each node. Key generating & encryption component 240 may send the respective encrypted compression key 253 and/or compression instructions to each node of the idempotent service in the cluster 210.

For each node that receives the encrypted compression key and/or compression instructions, the node may decrypt the encrypted compression key and then use the decrypted compression key to compress message IDs stored in the data store of the node. Using node 250 as an example, key generating & decryption component 280 may receive the encrypted compression key and/or compression instructions for compressing message IDs stored in the data store of node 250. Key generating & decryption component 280 may use a private key that is paired with the public key to decrypt the encrypted compression key and generate a decrypted compression key.

Message compression/decompression component 290 may compress the message IDs stored in the data store of node 250 using the decrypted compression key. In some implementations, message compression/decompression component 290 may compress the message IDs that are not compressed. The compression instruction received from the server node 220 may indicate to compress one or more message IDs or all messaged IDs stored in the data store of node 250. For example, the compression instruction may include the number of the messaged IDs to be compressed, criteria for choosing message IDs to be compressed, etc. For example, the criteria for choosing message IDs to be compressed may include choosing the message IDs that have been generated in a time that has passed a duration threshold. In some implementations, while compressing message IDs, message compression/decompression component 290 may set a compression flag (e.g., compression=Y) for each compressed message ID indicating that the message ID is in compressed format.

In some implementations, upon completing compression of message IDs, message compression/decompression component 290 may set its compression status to "compressed" and calculate the remaining storage and the remaining battery after the compression. Message compression/decompression component 290 may send, to the server node 220, a notification 254 indicating the compressed status of node 250. Message compression/decompression component 290 may broadcast its node ID, the updated remaining storage, and the updated remaining battery to other nodes so that the other nodes can update its respective proximity table.

After the compression of messaging IDs stored in the data store of node 250, node 250 may redetermine that whether a node is available to store the received message as described above and repeat the process until the received message can be stored. In one implementations, because more memory space in the data store of node 250 would be available after the compression, node 250 may be able to store the message.

The server node 220 may check with nodes (e.g., nodes with "compressed" status listed in the compression table 157) of the cluster 210 to determine whether to invoke a process of decompression of message IDs with respect to a specific node. In some implementations, at a defined time window (e.g., periodically, semi-periodically, at a time determined by available network bandwidth, latency, etc.), the server node 220 may broadcast a request to the nodes of the cluster 210 to request an update on information with respect to the remaining resources (e.g., remaining storage and the remaining battery) of the node. After receiving the updated information, the server node 220 may determine whether the remaining resources of the node satisfy one or more threshold criteria for decompression. For example, compression/decompression invoking component 230 may determine whether the remaining storage satisfies a storage threshold criterion for decompression, whether the remaining battery satisfies a battery threshold criterion for decompression, or a combination thereof. To simplify the description, the remaining storage is used for illustration.

In some implementations, compression/decompression invoking component 230 may compare the remaining storage of each node to a respective storage threshold (which can be the same or different to each other) (e.g., low_memory_threshold). If the remaining storage of any node is above the respective storage threshold, compression/decompression invoking component 230 may enable the server node 220 to invoke a decompression process on that node. Using node 250 as an example, compression/decompression invoking component 230 may send decompression instructions 255 to node 250, and message compression/decompression component 290 of node 250 may, based on the decompression instructions, decompress the message IDs using the respective decrypted compression key stored in the data store of the node 250. The decompression instruction received from the server node 220 may indicate to decompress one or more compressed message IDs or all compressed message IDs stored in the data store of node 250. For example, the decompression instruction may include the number of the messaged IDs to be decompressed, criteria for choosing message IDs to be decompressed, etc. For example, the criteria for choosing message IDs to be decompressed may include choosing the message IDs that have been generated in a time that has passed a duration threshold. In some implementations, while decompressing message IDs, message compression/decompression component 290 may set a decompression flag (e.g., decompression=Y)

or delete the compression flag for each decompressed message ID indicating that the message ID is in decompressed format.

In some implementations, upon completing decompression of message IDs, message compression/decompression component 290 may set its compression status to "decompressed" and calculate the remaining storage and the remaining battery after the decompression. Message compression/decompression component 290 may send, to the server node 220, a notification 256 indicating the decompressed status of node 250. Message compression/decompression component 290 may broadcast its node ID, the updated remaining storage, and the updated remaining battery to other nodes so that the other nodes can update its respective proximity table.

Figure 4:
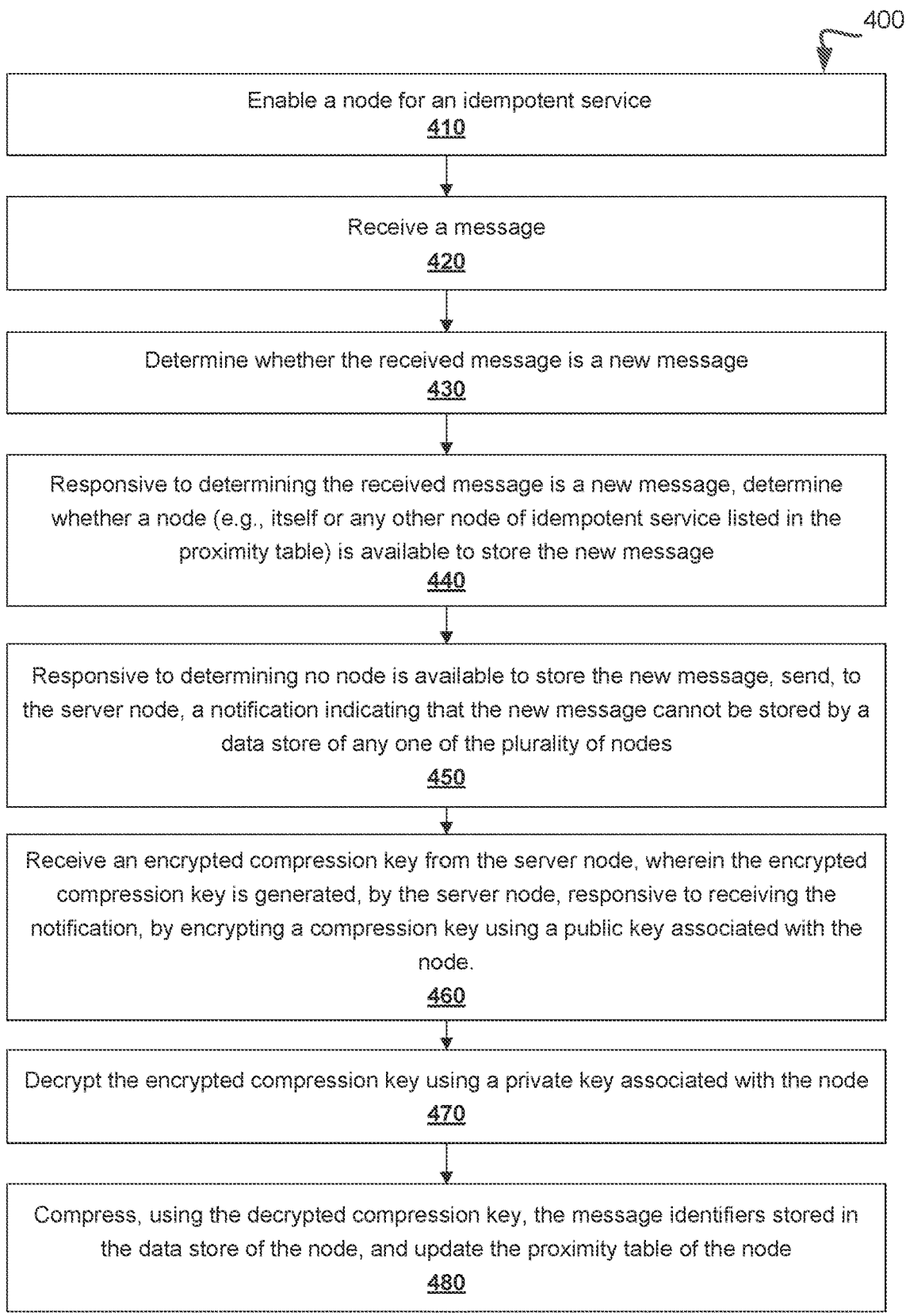
FIG. 4 depicts a flow diagram of an example method for a node implementing adaptive asymmetric-key compression for idempotent data stores in computer messaging, in accordance with one or more aspects of the present disclosure.
Figure 5:
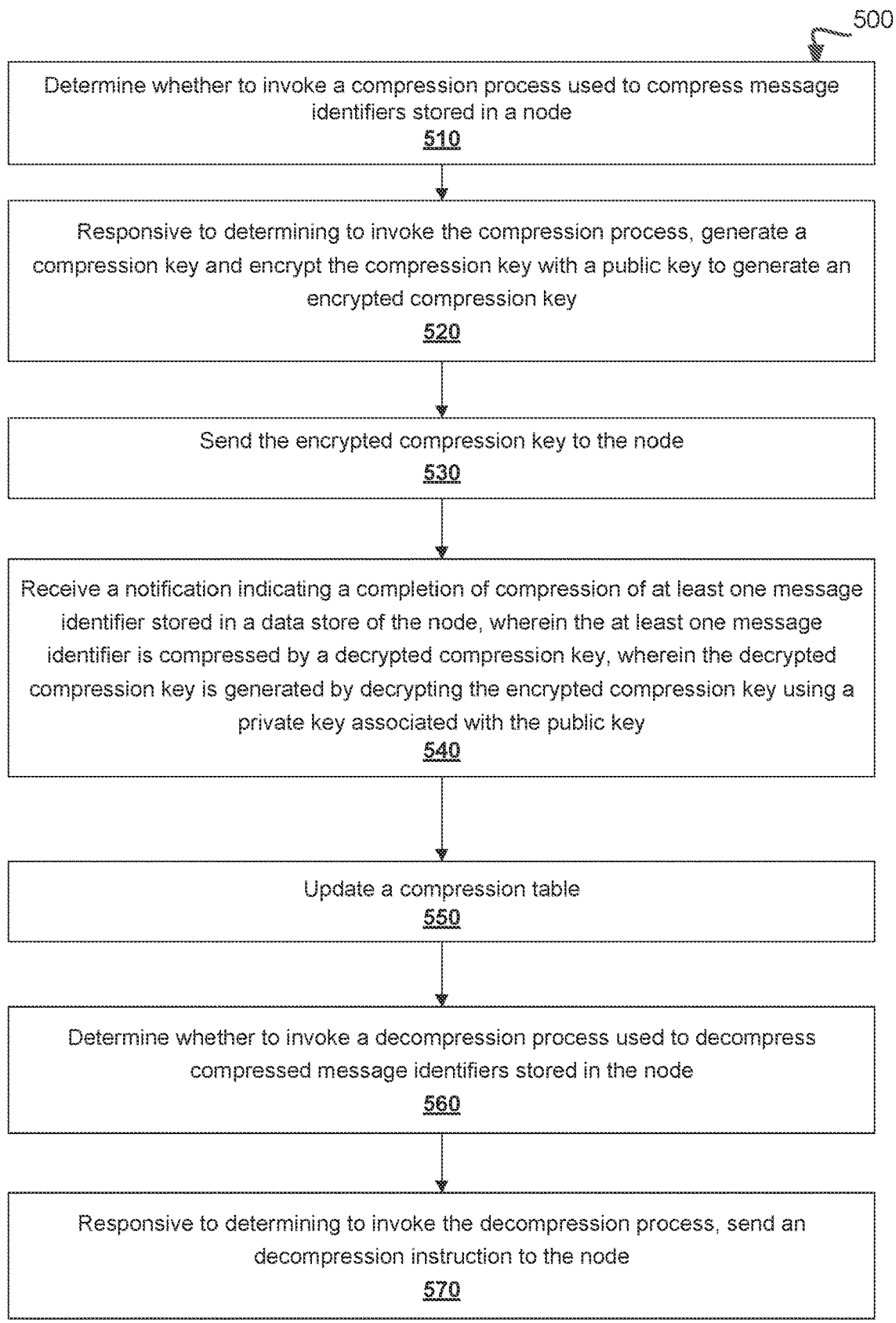
FIG. 5 depicts a flow diagram of an example method for a server node implementing adaptive asymmetric-key compression for idempotent data stores in computer messaging, in accordance with one or more aspects of the present disclosure.

FIGS. 4 and 5 depict flow diagrams of illustrative examples of methods 400 and 500 for implementing a routing system for data grid in a containerized computing cluster, in accordance with one or more aspects of the present disclosure. Methods 400 and 500 and each of its individual functions, routines, subroutines, or operations may be performed by one or more processors of the computer device executing the method. In certain implementations, methods 400, 500, and 600 may be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processes implementing methods 400 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, method 400 may be performed by processing devices of a node (e.g., node 250) of a cluster. At operation 410, the processing device may enable a node for an idempotent service. The processing device may enable a node to join the idempotent service by setting up a proximity table for the idempotent service. In some implementations, to set up the proximity table, the processing device may send a message to all other nodes in the cluster that are within a distance defined by a maximum threshold, and receive responses from all other nodes that indicates: node identifier; node's remaining amount of storage; node's remaining battery life (if applicable); and node's status (enabled or disabled) with respect to the idempotent service. The processing device may set up the proximity table using the received information.

At operation 420, the processing device may receive a message, where the message includes a message identifier and payload data. At operation 430, the processing device may determine whether the received message is a new message by determining whether the message identifier is stored. The processing device may search the data store (e.g., a data structure) of the node to determine if the message identifier is stored therein and/or communicate with all other nodes in the cluster to determine if message identifier is stored by any of them. Responsive to determining the received message is not a new message, the processing device may discard (e.g., filter out) the message without ingesting the payload data of the message.

At operation 440, responsive to determining the received message is a new message, the processing device may determine whether a node is available to store the new message. The processing device may determine whether a node is available to store a message by determining whether the remaining resources of any node in the cluster satisfy one or more threshold criteria for compression. For example, the processing device may determine whether the remaining storage satisfies a storage threshold criterion for compression, whether the remaining battery satisfies a battery threshold criterion for compression, or a combination thereof. Responsive to determining at least one node is available to store the new message, the processing device may store the new message accordingly.

At operation 450, responsive to determining no node is available to store the message, the processing device may ping the server node by sending, to the server node, a notification indicating that no node is available to store the message. The processing device may send, to the server node, information required for generating compression keys used in compression. For example, the processing device may send node identifiers (e.g., node IDs) of nodes of the idempotent service, from the proximity table of the node, and send public keys corresponding to each node identifier. The public keys are used by the server node to encrypt a compression key to generate an encrypted compression key for each node.

At operation 460, the processing device may receive, from the server node, an encrypted compression key. The encrypted compression key is generated, by the server node, responsive to receiving the notification, by encrypting a compression key using a public key associated with the node. Each node of the idempotent service in the cluster may receive the respective encrypted compression key and/or compression instructions from the server node. The respective encrypted compression key is generated by encrypting a compression key using a respective public key associated with the respective node.

At operation 470, the processing device may decrypt the encrypted compression key to generate a decrypted compression key. The processing device may use a private key, which is paired with the public key for the respective node, to decrypt the encrypted compression key and generate a decrypted compression key.

At operation 480, the processing device may compress messenger identifiers with the decrypted compression key and update the proximity table. The processing device may use the compression instruction received from the server node to compress one or more message identifiers or all messaged identifiers stored in the data store of node. For example, the compression instruction may include the number of the messaged identifiers to be compressed, criteria for choosing message identifiers to be compressed, etc. Upon completing compression of message identifiers, the processing device may set its compression status to "compressed" and calculate the remaining storage and the remaining battery after the compression. The processing device may update the proximity table of the node based on the above information and broadcast the information to other nodes so that the other nodes can update its respective proximity table. The processing device may send a notification indicating a completion of compression of at least one message identifier stored in a data store of the node.

Referring to FIG. 5, method 500 may be performed by processing devices of a server node (e.g., server node 220) of a cluster. At operation 510, the processing device may determine whether to invoke a compression process used to compress message identifiers stored in a node. In some implementations, the processing device may determine to invoke a compression process responsive to receiving a notification that a message cannot be stored. That is, upon receiving the notification, the processing device may enable the server node to invoke a process for compression of message identifiers stored in nodes of the idempotent service in the cluster to increase the available resources (e.g., the remaining storage) of the nodes. The processing device may request information required for generating compression keys used in compression. For example, the processing device may request and in response, obtain node identifiers (e.g., node IDs) of nodes of the idempotent service, from the proximity table of the respective node, and obtain public keys corresponding to the node identifiers.

In some implementations, the processing device may determine to invoke a compression process responsive to determining that remaining resources of a node (e.g., the node 250, or each node listed in the proximity table of the node 250) satisfy one or more threshold criteria for compression. For example, the processing device may determine whether the remaining storage satisfies a storage threshold criterion for compression, whether the remaining battery satisfies a battery threshold criterion for compression, or a combination thereof.

At operation 520, upon determining to invoke the compression process, the processing device may generate a compression key and encrypt the compression key with a public key to generate an encrypted compression key. The public key may be paired with a private key associated with the respective node for encryption and decryption. At operation 530, the processing device may send the encrypted compression key to a node. The processing device may send the respective encrypted compression key and/or compression instructions to each node of the idempotent service in the cluster. For each node that receives the encrypted compression key and/or compression instructions, the node may decrypt the encrypted compression key and then use the decrypted compression key to compress message identifiers stored in the data store of the node.

At operation 540, the processing device may receive a notification of a completion of compression of at least one message identifier stored in a data store of the node, where the at least one message identifier is compressed, by the node, by a decrypted compression key, where the decrypted compression key is generated, by the node, by decrypting the encrypted compression key using a private key associated with the public key. Upon completing compression of message identifiers, a node may set its compression status to "compressed" and calculate the remaining storage and the remaining battery after the compression, and the processing device may receive, from the node, an indication of completion of the compression process. That is, the processing device received a notification of storing, in a compressed form using the decrypted compression key, at least one message identifier in a data store of the node. At operation 550, the processing device may update a compression table based on the information received from the node.

At operation 560, the processing device may determine whether to invoke a decompression process. In some implementations, at a defined time window (e.g., periodically, semi-periodically, at a time determined by available network bandwidth, latency, etc.), the processing device may broadcast a request to the nodes of the cluster to request an update on information with respect to the remaining resources (e.g., remaining storage and the remaining battery) of the node. After receiving the updated information, the processing device may determine whether the remaining resources of the node satisfy a threshold criterion for decompression. For example, the processing device may determine whether the remaining storage satisfies a storage threshold criterion for decompression, whether the remaining battery satisfies a battery threshold criterion for decompression, or a combination thereof. Responsive to determining that the remaining resources of the node satisfy a threshold criterion for decompression, the processing device may determine invoke a decompression process.

At operation 570, responsive to determining to invoke a decompression process, the processing device may send a decompression instruction to the corresponding node. The corresponding node may, based on the decompression instruction, decompress the message identifiers using the respective decrypted compression key stored in the data store of the node. The decompression instruction may indicate to decompress one or more compressed message identifiers or all compressed message identifiers stored in the data store of the node. For example, the decompression instruction may include the number of the messaged identifiers to be decompressed, criteria for choosing message identifiers to be decompressed, etc.

Figure 6:
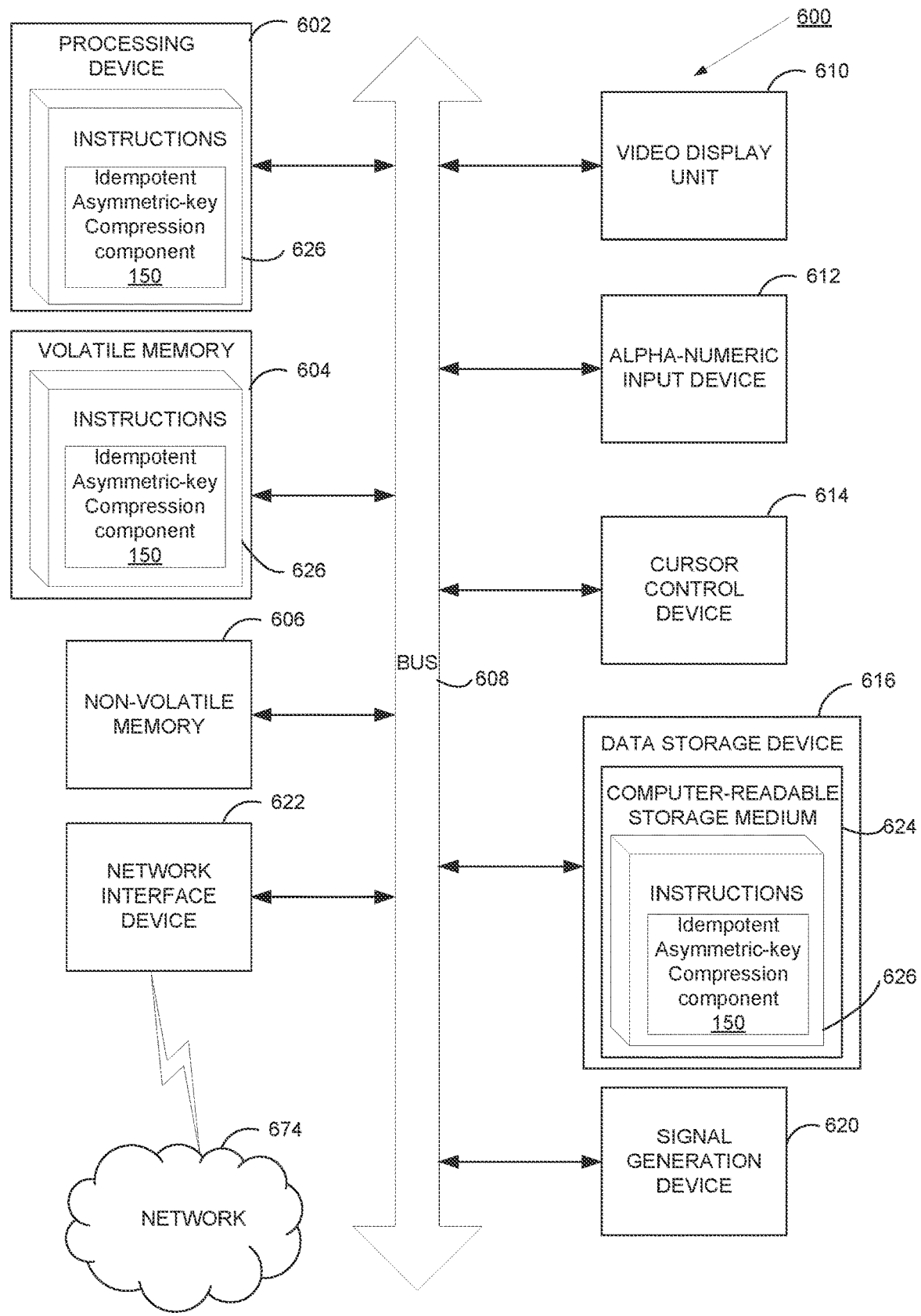
FIG. 6 depicts a block diagram of an example computer system operating in accordance with one or more aspects of the present disclosure.

FIG. 6 depicts an example computer system 600, which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 is configured to execute processing logic (e.g., instructions 626) that includes the idempotent asymmetric-key compression component 150 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include the idempotent asymmetric-key compression component 150 (e.g., corresponding to the methods of FIGS. 4-5) embodying any one or more of the methodologies or functions described herein. Idempotent asymmetric-key compression component 150 may also reside, completely or at least partially, within the main memory 604 and/or within the processing device 602 during execution thereof by the computer system 600, the main memory 604, and the processing device 602 also constituting computer-readable media.

While the computer-readable storage medium 624 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may include a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method, comprising:
    receiving, by a server node, a first notification indicating that a first message received by a first node of a cluster of nodes is not a redundant message and cannot be stored by a data store of the nodes, wherein the nodes are managed by the server node;
    determining to invoke a compression process used to compress message identifiers stored in the first node;
    receiving a first public key associated with the first node;
    generating a compression key;
    generating, responsive to determining to invoke the compression process used to compress the message identifiers stored in the first node, a first encrypted compression key by encrypting the compression key with the first public key;
    sending, to the first node, the first encrypted compression key; and
    receiving, from the first node, a second notification of storing, in a compressed form using a key decrypted from the first encrypted compression key, at least one message identifier in a data store of the first node.

2. The method of claim 1, wherein determining to invoke the compression process is performed responsive to receiving the first notification.

3. The method of claim 1, wherein determining to invoke the compression process is performed responsive to evaluating a threshold criterion of compression.

4. The method of claim 3, wherein evaluating the threshold criterion of compression comprises:
    determining whether a remaining resource of the first node satisfies a first threshold criterion of compression; and
    determining whether a remaining resource of each node listed in a proximity table of the first node satisfies a respective threshold criterion of compression, wherein data of the remaining resource of each node is received from the first node.

5. The method of claim 1, further comprising:
    responsive to receiving the first notification, determining to invoke the compression process used to compress message identifiers stored in each node listed in a proximity table of the first node.

6. The method of claim 1, further comprising:
    generating, by the server node, a compression table, wherein the compression table specifies a list of nodes each associated with an indication of a compression status of message identifiers stored in a data store of a respective node.

7. The method of claim 6, further comprising:
    responsive to receiving the second notification, updating the compression table.

8. The method of claim 1, further comprising:
    determining, by the server node, to invoke a decompression process used to decompress compressed message identifiers stored in the first node; and
    sending, to the first node, an instruction to decompress compressed message identifiers stored in the first node.

9. The method of claim 8, further comprising:
    determining whether a remaining resource of the first node satisfies a first threshold criterion of decompression; and
    determining whether a remaining resource of each node listed in a proximity table of the first node satisfies a respective threshold criterion of decompression.

10. A system comprising:
    a memory; and
    a processing device coupled to the memory, the processing device to perform operations comprising:
    determining, by a server node, to invoke a compression process used to compress message identifiers stored in a first node of a cluster of nodes, wherein the nodes are managed by the server node;
    receiving a first public key associated with the first node;
    generating a compression key;
    generating, responsive to determining to invoke the compression process used to compress the message identifiers stored in the first node, a first encrypted compression key by encrypting the compression key with the first public key;
    sending, to the first node, the first encrypted compression key; and
    receiving, from the first node, a second notification of storing, in a compressed form using a key decrypted from the first encrypted compression key, at least one message identifier in a data store of the first node.

11. The system of claim 10, wherein the processing device is to perform operations further comprising:
    receiving, a first notification indicating that a first message received by the first node is not a redundant message and cannot be stored by a data store of the nodes,
    wherein determining to invoke the compression process is performed responsive to receiving the first notification.

12. The system of claim 11, wherein the processing device is to perform operations further comprising:
    responsive to receiving the first notification, determining to invoke the compression process used to compress message identifiers stored in each node listed in a proximity table of the first node.

13. The system of claim 10, wherein determining to invoke the compression process is performed responsive to evaluating a threshold criterion of compression.

14. The system of claim 13, wherein evaluating the threshold criterion of compression comprises:
    determining whether a remaining resource of the first node satisfies a first threshold criterion of decompression; and
    determining whether a remaining resource of each node listed in a proximity table of the first node satisfies a respective threshold criterion of compression, wherein data of the remaining resource of each node is received from the first node.

15. The system of claim 10, wherein the processing device is to perform operations further comprising:
    generating, by the server node, a compression table, wherein the compression table specifies a list of nodes each associated with an indication of a compression status of message identifiers stored in a data store of a respective node.

16. The system of claim 15, wherein the processing device is to perform operations further comprising:
responsive to receiving the second notification, updating the compression table.

17. The system of claim 10, wherein the processing device is to perform operations further comprising:
determining, by the server node, to invoke a decompression process used to decompress compressed message identifiers stored in the first node; and
sending, to the first node, an instruction to decompress the compressed message identifiers stored in the first node.

18. The system of claim 10, wherein the processing device is to perform operations further comprising:
determining whether a remaining resource of the first node satisfies a first threshold criterion of decompression; and
determining whether a remaining resource of each node listed in a proximity table of the first node satisfies a respective threshold criterion of decompression.

19. A non-transitory computer-readable storage medium comprising instructions that, when executed by a processing device, cause the processing device to perform operations comprising:
receiving, by a server node, a first notification indicating that a first message received by a first node of a cluster of nodes is not a redundant message and cannot be stored by a data store of the nodes, wherein the nodes are managed by the server node;
determining to invoke a compression process used to compress message identifiers stored in the first node;
receiving a first public key associated with the first node;
generating a compression key;
generating, responsive to determining to invoke the compression process used to compress the message identifiers stored in the first node, a first encrypted compression key by encrypting the compression key with the first public key;
sending, to the first node, the first encrypted compression key; and
receiving, from the first node, a second notification of storing, in a compressed form using a key decrypted from the first encrypted compression key, at least one message identifier in a data store of the first node.

20. The computer-readable non-transitory storage medium of claim 18, wherein determining to invoke the compression process is performed responsive to receiving the first notification or evaluating a threshold criterion of compression.

* * * * *